UNITED STATES PATENT OFFICE 2,651,624

CURABLE COMPOUNDS OF UNSATURATED ALDEHYDE POLYMERS AND METHOD OF MAKING THE SAME

Gilbert H. Swart, Akron, Ohio, assignor to The General Tire and Rubber Company, Akron, Ohio, a corporation of Ohio No Drawing. Application August 19, 1949, Serial No. 111,335

7 Claims. (Cl. 260—67.5)

This invention relates to curable or thermosetting resinous and rubberlike compositions, to a method of preparing such compositions, and to articles prepared therefrom. It particularly relates to rubbery and resinous compositions which may be cured or changed from the soluble to the insoluble state and which have in their cured state excellent aging properties.

It is now generally recognized that plastic and thermoplastic properties in resins or rubbers are associated with noncrosslinked or relatively noncrosslinked molecules which are extremely large and are held together only by secondary forces. When a thermoplastic and soluble material is changed to the nonthermoplastic and insoluble state, it is generally recognized that a chemical bridging or crosslinking of the molecules occurs so that they form an interlocking network that cannot be separated by solvent action, etc. In the rubbery materials of the prior art this has generally been accomplished by vulcanizing agents such as sulfur, a single molecule of which may combine with two or more polymer molecules that have substantial chemical unsaturation to form a bridge in a cured or thermoset product.

Rubber articles, for example, vulcanized with sulfur have some undesirable properties. The hot tensile strength for example is considerably less than is desired in many instances. The flexing and tensile strength after aging for substantial periods usually becomes deteriorated to a very substantial degree. Because of these undesirable properties in the case of sulfur-vulcanized polymeric materials, many attempts have been made to substitute other vulcanizing agents for sulfur. Certain organic peroxides, bifunctional phenyl compounds, etc., have been proposed, but as far as applicants are aware none of these has been anywhere nearly as successful as sulfur in the vulcanization of thermoplastic or plastic materials.

It is an object of the present invention to provide rubberlike and resinous compounds which may be converted from the plastic or thermoplastic to the vulcanized or thermosetting state without sulfur, and which in the vulcanized state have properties that are superior in many respects to articles vulcanized with sulfur.

Another object of the present invention is to provide vulcanized rubbery and resinous materials which are able to withstand prolonged exposure to curing temperatures without deterioration.

A further object is to provide a process of preparing vulcanized elastomers having exceptional aging properties.

In the application of Gerson S. Schaffel and Kermit V. Weinstock, Serial No. 111,344, of even date herewith and assigned to the same assignee as is the present invention, it is disclosed that polymers containing ketone groups connected integrally into the polymer molecules are vulcanizable with hexamethylene tetramine and other compounds which at elevated temperatures liberate a nitrogenous base into the thermoset or thermoplastic state.

I have found that the various polymers and copolymers of unsaturated aldehyde are also vulcanizable with hexamethylene tetramine and like materials provided they have an alkyl group attached to the carbon adjacent the carbonyl group. The compounds with which the present invention is concerned are therefore polymers and interpolymers of unsaturated aldehydes of the following general formula,

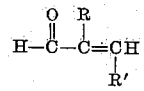

where R is alkyl, preferably methyl, and R' is selected from the group consisting of hydrogen and alkyl.

It is known that compounds included by the above general formula may be copolymerized with certain mono-olefinic and diolefinic compounds. The present invention is not primarily concerned with old or new copolymers per se, but rather with the vulcanization and compounding of such copolymers to produce rubbers and resinous articles which have unique or novel properties. In preparing the rubbery and resinous copolymers for the preparation of compounds of the present invention, any of the various methods of polymerization may be used, although aqueous emulsion polymerization is generally preferred.

When plastic rubbery materials are desired, a polymerizable conjugated diene or diolefinic compound of less than seven aliphatic carbon atoms is preferred as at least one of the comonomers. The total diolefinic compound should ordinarily be present in amounts greater than 40 or 45% of the total copolymerizable materials and 70 to 85% of diolefine or diolefinic compound is usually present. Up to 90%, or even 95% of diolefine or diolefinic compound may however be present while still permitting the formation of a product curable by the process of the present invention. Such diolefinic compounds include chloroprene, isoprene, butadiene-1,3, 2,3-dimethyl butadiene, etc. Rubbery materials may, however, also be prepared as is well known by copolymerizing a compound containing the aforementioned aldehyde or ketone group with mono-olefinic compounds, such for example as isobutylene, ethyl acrylates and higher acrylate esters.

When resinous copolymers are desired or when materials intermediate between the rubbery and resinous state are desired, a major proportion of the copolymerizable comonomers should generally be a mono-olefinic compound polymerizable to the nonrubbery or hard plastic state. Examples of such comonomers are the acrylic esters, such for example as acrylo nitrile, methyl and ethyl acrylates, the higher acrylates and corresponding methacrylic compounds, styrene, alpha-methylstyrene, 3,4-dichloro-alpha-methylstyrene, dimethyl vinyl ethynyl carbinol, etc. One or more of these materials, with or without one or more of the above diolefinic compounds as modifying agents, may be present. The rubberlike characteristics are increased with increasing proportion of diolefinic compound. The unsaturated olefinic compounds of the above general formula should constitute at least 4 or 5% of the copolymerizable monomers, and 15 to 20% or more is preferred in the polymeric material for a tight cure.

When it is desired to produce a resinous material that is curable with a nitrogenous base, such as hexamethylene tetramine, etc., mono-olefinic compounds may constitute the sole monomeric materials. The unsaturated aldehydes may be substituted in part by unsaturated ketones, acetyl styrenes, etc., as described in the aforementioned copending application assigned to the assignee hereof.

The preferred examples of the unsaturated aldehydes that may be polymerized or copolymerized with other materials, including the mono- and diolefinic compounds mentioned herein, are methacrolein and tiglaldehyde, although other aldehydes within the above general formula may be substituted in whole or in part for these materials. Mixtures of polymerizable olefinic compounds containing unsaturated aldehydes having hydrogen on the unsaturated carbon atom adjacent the carbonyl group of the aldehyde apparently do not copolymerize by free radical mechanism except with extreme difficulty, if at all. It appears that such unsaturated aldehydes, of which croton aldehyde and acrolein are examples, are inhibitors or substantial inhibitors for this type of copolymerization. Although the present invention is primarily concerned with free radical copolymers, curable compounds may be formed by polymerizing or copolymerizing these latter unsaturated aldehydes with the aid of an acid catalyst, such as a Friedel-Crafts catalyst.

While any of the nitrogenous bases, such as ammonia, polyamines and the like, capable of combination with two or more primary valent radicals, function as curing agents, such materials are not nearly as desirable as are compounds which provide a nitrogenous base at elevated or curing temperatures for the reason that their reaction and set-up occurs during the mixing process. Curing agents such as hexamethylene tetramine, which at elevated temperatures liberates an aldehyde or active methylene group in addition to the nitrogenous base, are much superior to those which liberate only a nitrogenous base; and the vulcanized polymers have superior and quite different characteristics. They are not, for example, hydrolyzable by contact with boiling water as are those which are cured with nitrogenous bases alone, and the rubbery polymers cured with hexamethylene tetramine and/or aldehydes in combination with nitrogenous bases have better aging and flexing properties.

I have found that the presence of acidic materials, such for example as an organic acid, an organic ester which may hydrolyze to some extent to produce acids at curing temperatures, or acidic pigment such as channel black or the like, is desirable and frequently necessary in order to produce a good cure with hexamethylene tetramine. The combination with hexamethylene tetramine and an acidic substance which provides a pH of less than 7 at curing temperatures is therefore an essential in the preferred process of the present invention. The acidic substance may be organic or inorganic and a part of or separate from the polymer. Organic materials are desired for the reason that they are somewhat more compatible with the polymeric materials. In the case of acrylic ester copolymers, etc., the acidic substance is part of the polymer and is produced by hydrolysis or breakdown of the ester group.

The following examples, in which parts are by weight, illustrate the present invention:

*Example*

| | Parts |
|---|---|
| Water | 180 |
| Butadiene | 70 |
| Methacrolein | 30 |
| Sodium stearate | 5 |
| Dodecyl mercaptan | .5 |
| Potassium persulfate | .25 |

This mixture is agitated in a closed reactor at 40° C. until a monomer conversion of approximately 75% is reached. The latex is then coagulated with salt and acid in accordance with the usual commercial process for preparing "GRS" rubber (trade name for butadiene and styrene copolymer prepared by Reconstruction Finance Corporation). The coagulum is washed and dried and the polymer compounded in accordance with the following recipe:

| | Parts |
|---|---|
| Dried copolymer of butadiene and methacrolein | 100 |
| EPC carbon black (easy processing channel) | 50 |
| Hexamethylene tetramine | 2 |
| Salicylic acid | .5 |
| Pine tar | 4 |
| BLE (antioxidant) | 1 |

The compound thus obtained is sheeted out and cured in slabs between platens at 300° F. until maximum curing effect has been obtained. The polymer is rubberlike and is in the thermoset or vulcanized state. The cured product ages well and has a tensile strength in the aged condition very nearly equivalent to the tensile strength in the unaged condition.

When the methacrolein is substituted by tiglaldehyde or other aldehydes within the aforementioned general formula, a copolymerization product vulcanizable with hexamethylene tetramine and other materials which are bases at curing temperatures is also obtained. The butadiene may be substituted in whole or in part by other polymerizable conjugated diolefinic compounds and/or by other mono-olefinic compounds, such as any of those aforementioned, to produce rubbery or resinous products which are vulcanizable with hexamethylene tetramine and the like.

The term "polymer" is here used in its generic sense to include copolymers. The residues from one molecule of the unsaturated aldehydes of the aforementioned formula have after polymerization or copolymerization with another polymerizable molecule the general formula

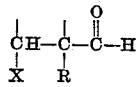

where the free bonds are attached to the residue from other molecules of monomeric materials after polymerization, and where X is hydrogen or alkyl and R is alkyl and is preferably methyl. The terms "olefinic polymer" and "olefinic copolymer" are used in the appended claims to designate polymers wherein the double bonds from the olefinic group of the monomer, i. e., the carbon-to-carbon double bonds enter into the polymerization reaction to hold the units together. One of these double bonds in the olefinic monomers forms the free bonds shown in the next preceding general formula.

Although the invention may be employed in various ways, only preferred embodiments have been illustrated and described. Other embodiments may be made within the invention as provided by the patent statutes.

What I claim is:

1. In a method of curing a copolymer of a conjugated diolefinic compound having less than seven aliphatic carbon atoms and a monomeric aldehyde compound having the general formula

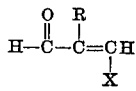

where R is alkyl and X is selected from the group consisting of hydrogen and alkyl, which copolymer contains in combined form at least 40 per cent of a diolefinic compound and in combined form at least 4 per cent of a monomeric aldehyde compound within the above general formula the steps which comprise incorporating into a continuous phase of said copolymer hexamethylene tetramine and a material which at elevated temperatures provides a pH of less than seven, and thereafter heating the mixture to a temperature between 250 and 400° F. for a sufficient time to change said copolymer from the plastic to the elastic state.

2. A curable solid continuous phase comprising a plastic polymeric composition comprising a copolymerization product of methacrolein and a diolefine of less than 7 aliphatic carbon atoms, said continuous phase containing in admixture with said plastic polymeric composition hexamethylene tetramine and said copolymerization product containing at least 40% by weight of said diolefine in combined form and at least 4% by weight of said methacrolein in combined form.

3. The composition of claim 2 which also contains a substance which provides a pH of less than 7 at curing temperatures.

4. In a method of curing an olefinic polymer of methacrolein having at least 4% by weight of said polymer made up of units of the formula

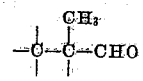

wherein said free valence bonds are connected to other elements of the polymer molecule, the steps which comprise incorporating in a continuous phase of said polymer hexamethylene tetramine and thereafter heating the mixture thus formed at sufficiently elevated temperatures to convert said polymer from the plastic to the elastic state, said temperatures being not destructive to said polymer.

5. In a method of curing an olefinic copolymer of (1) a monomeric aldehyde compound having the general formula

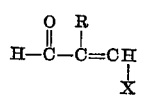

where R is alkyl and X is selected from the group consisting of hydrogen and alkyl, and (2) another compound selected from the group comprising mono-olefinic compounds polymerizable to the hard plastic state and a conjugated diolefinic compound of less than seven aliphatic carbon atoms, which copolymer contains in combined form at least 40% of a said group member and in combined form at least 4% of a monomeric aldehyde compound within the above general formula, the steps which comprise mixing said copolymer with hexamethylene tetramine in the presence of a material which at elevated temperatures provides a pH of less than seven, and thereafter heating the mixture to a temperature between 250 and 400° F. for a sufficient time to change said copolymer from the plastic to the elastic state.

6. In a method of curing an olefinic copolymer of (1) a monomeric aldehyde compound having the general formula

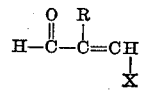

where R is alkyl and X is selected from the group consisting of hydrogen and alkyl, and (2) another mono-olefinic compound polymerizable to a hard but plastic state, which copolymer contains in combined form at least 4% of a monomeric aldehyde compound within the above general formula, the steps which comprise mixing said copolymer with hexamethylene tetramine in the presence of a material which at elevated temperatures provides a pH of less than seven, and thereafter heating the mixture to a temperature between 250 and 400° F. for a sufficient time to change said copolymer from the plastic to the elastic state.

7. In a method of curing a mass of plastic polymer of a monomeric material having the general formula

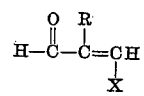

where R is alkyl and X is selected from the group consisting of hydrogen and alkyl, which polymer contains in combined form at least 5 per cent of compounds within the above general formula, the steps which comprise incorporating in said polymer hexamethylene tetramine and thereafter heating the mixture at elevated temperatures sufficient to liberate active methylene groups and a nitrogenous base from said hexamethylene tetramine and for a sufficient time to convert said polymer from the plastic to the elastic state.

GILBERT H. SWART.

References Cited in the file of this patent

UNITED STATES PATENTS

| Number | Name | Date |
| --- | --- | --- |
| 2,212,894 | Allen | Aug. 27, 1940 |
| 2,388,167 | Marple | Oct. 30, 1945 |
| 2,467,430 | Izard | Apr. 19, 1949 |
| 2,478,154 | Evans | Aug. 2, 1949 |
| 2,485,239 | Izard | Oct. 18, 1949 |
| 2,569,932 | Izard | Oct. 2, 1951 |